United States Patent [19]
Britze

[11] Patent Number: 4,819,771
[45] Date of Patent: Apr. 11, 1989

[54] VIBRATION DAMPER FOR VEHICLES

[75] Inventor: Manfred Britze, Stuttgart, Fed. Rep. of Germany

[73] Assignee: Daimler-Benz AG, Stuttgart, Fed. Rep. of Germany

[21] Appl. No.: 15,712

[22] Filed: Feb. 17, 1987

[30] Foreign Application Priority Data

Feb. 15, 1986 [DE] Fed. Rep. of Germany ....... 3604844

[51] Int. Cl.$^4$ .............................................. F16F 9/46
[52] U.S. Cl. .................... 188/299; 188/319; 280/714
[58] Field of Search ........... 188/285, 299, 319, 322.15; 267/127; 280/714

[56] References Cited

U.S. PATENT DOCUMENTS

| | | | |
|---|---|---|---|
| 2,836,264 | 5/1958 | Groen | 188/319 |
| 4,645,043 | 2/1987 | Imaizumi | 188/319 |

FOREIGN PATENT DOCUMENTS

| | | | |
|---|---|---|---|
| 869717 | 6/1952 | Fed. Rep. of Germany . | |
| 1858547 | 9/1960 | Fed. Rep. of Germany . | |
| 1181074 | 11/1964 | Fed. Rep. of Germany . | |
| 3421601 | 12/1985 | Fed. Rep. of Germany . | |
| 166150 | 10/1983 | Japan | 188/299 |
| 465335 | 12/1968 | Switzerland | 188/319 |
| 208449 | 12/1968 | U.S.S.R. | 188/299 |
| 2123922 | 2/1984 | United Kingdom | 188/319 |

Primary Examiner—George E. A. Halvosa
Attorney, Agent, or Firm—Barnes & Thornburg

[57] ABSTRACT

An adjustable damping force vibration damper for vehicles and the like is provided which includes a cylinder filled with damping fluid and a working piston axially moveable within the cylinder and dividing the cylinder into first and second spaces. Damping valves are disposed in surrounding relationship to the piston and serve to communicate damping fluid between the first and second cylinder spaces during relative movement of the working piston and cylinder during use. A damping level adjusting mechanism is provided for adjusting the flow of damping fluid between the first and second cylinder spaces, including a connecting duct disposed in bypassing relationship to the damping valves. An external actuated slideable control piston is disposed for controlling the opening of the connecting duct between the two cylinder spaces. A throttling piston is provided at one open bore of the control piston, which throttling piston is spring biased into a normal closing position against an opening of the connecting duct within the piston. The throttling piston is moveable against the spring in response to pressure forces between an open position and the closing position with limited fluid flow through a throttling bore in the throttling piston. A further throttling bore is provided in the connecting duct adjacent the end of the working piston opposite the control piston.

14 Claims, 1 Drawing Sheet

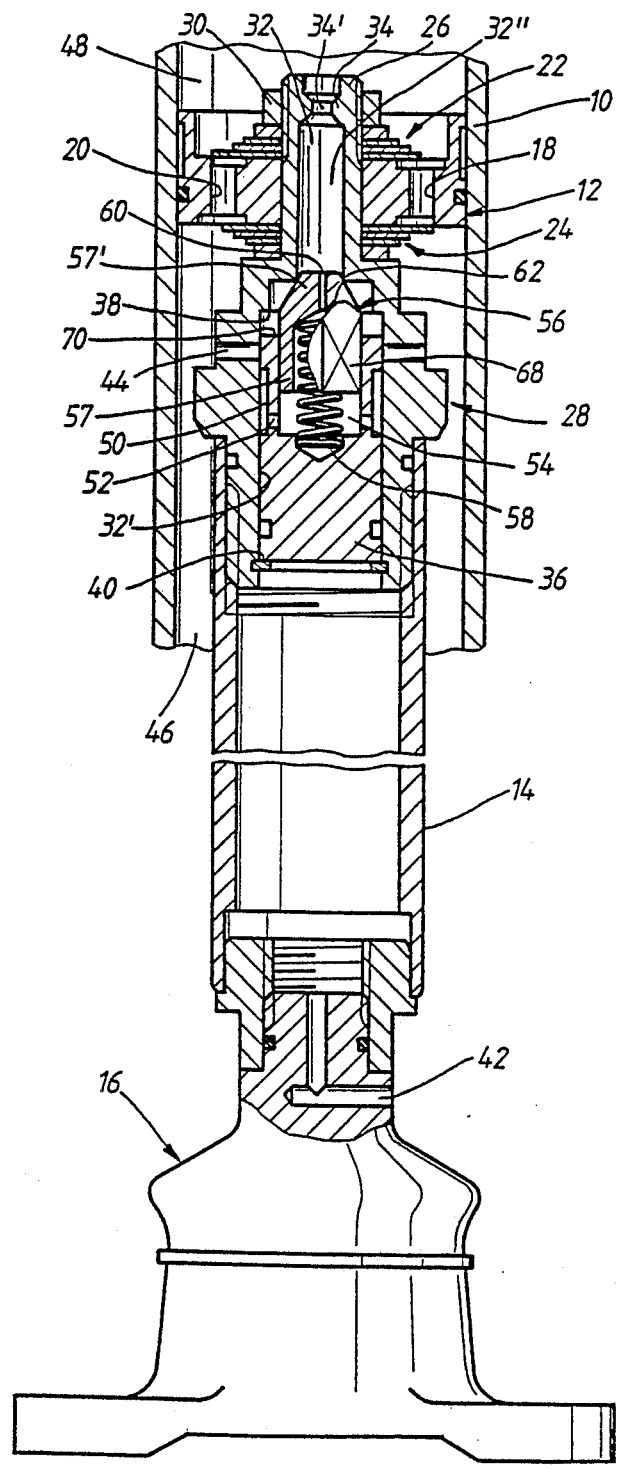

VIBRATION DAMPER FOR VEHICLES

BACKGROUND AND SUMMARY OF THE INVENTION

The invention relates to a vibration damper for vehicles of the type which has a piston and cylinder with fluid medium therein and having valve controls to control the medium flow between two cylinder spaces during relative movements of the piston and cylinder.

A vibration damper of this type is disclosed in German Published Unexamined Application No. (DE-OS) 34 21 601. In the case of this construction, the connecting duct that extends through the working piston has the purpose of admitting damping fluid to spring disks that cover valve bores of damping valves of the working piston, for the reduction of damping forces or for the softening of the damping against its closing force. This can be controlled arbitrarily from the driver's seat by means of the valve element that is adjustably arranged in the piston rod, for the opening and closing of the connecting duct.

In the case of this vibration damper, an adjustment of the damping forces is provided only for the tension stage. In addition, the construction is operable only in connection with the spring disks of the piston damping valves.

In addition, it requires a special equipping of the working piston with front-side recesses that are to be assigned to valve bores for the tension phase and that are to be connected with the connecting duct.

Other prior vibration dampers are disclosed in German Utility Model No. (DE-GM) 1858 547; German Published Examined Application No. (DE-AS) 1181 074; and German Patent No. (DE-PS) 869,717.

The invention is based on the objective of improving a vibration damper of the above-noted type in such a way that for the tensile stage as well as for the compression stage, a defined damping force reduction of varying intensity can be selected. In this case, the changing of the damping force should be possible independently of the development of the working piston.

This objective is achieved in a special control piston construction for controlling the communication between the cylinder spaces of the camper. In the case of the construction according to preferred embodiments of the invention, the change of damping force takes place exclusively by means of two throttles that are arranged in the connecting duct of the piston rod forming a bypass that is independent of the working piston. The special development of the damping valves of the working piston may therefore be arbitrary. Since in this case, the throttle that has the larger throttling resistance in the connecting duct pressure-dependently is arranged so that it can be moved back and forth between a passage position and a throttling position, the throttle having the lower throttling resistance becomes effective as soon as, during one of the two movements of the working piston, the movable throttle is steered from its throttling position in the direction of the passage position. By means of the corresponding dimensioning of the throttle cross-sections, a desired damping force reduction can be preselected for each operating stage.

Preferably, the movable throttle in this case determines the throttling resistance for the tensile stage.

The invention is equally advantageously suitable for single-tube and double-tube dampers as well as for the shock absorber of a hydropneumatic wheel suspension.

Other objects, advantages and novel features of the present invention will become apparent from the following detailed description of the invention when considered in conjunction with the accompanying drawings.

BRIEF DESCRIPTION OF THE DRAWINGS

The single drawing FIGURE is a partial longitudinal sectional view of an embodiment according to the invention of a vibration damper of a hydropneumatic shock absorbing leg that is developed as a single-tube shock absorber.

DETAILED DESCRIPTION OF THE DRAWINGS

The shown vibration absorber, among other things, has a damper cylinder 10 and a working piston 12 that is slidably guided at said damper cylinder 10 as well as a piston rod 14 penetrating said working piston 12. Said piston rod 14, in a sealed way, extends out of one end face of the cylinder and at the free rod end carries, for example, a ball joint 16 by means of which it can be hinged at a link of a wheel suspension or at a supporting part of a vehicle body.

The working piston 12, in the usual way, is provided with passage ducts 18 and 20 for the formation of valves for the tensile stage and the compression stage to which one stack 22 and 24 of laminated spring disks is assigned of which one respectively is provided at one of the central end faces of the piston and in each case covers only one group of passage ducts 18 or 20 at this end face of the piston.

The working piston 12 and the stacks 22 and 24 of spring disks are disposed on a cylindrical shaft 26 of a rod insert 28 that, in a sealed way, is inserted and particularly screwed into the inner front end of the hollow piston rod 14, and there are held by means of a threaded nut 30 that is screwed onto a shaft thread.

This rod insert 28 contains a connecting duct 32 that axially penetrates the cylindrical shaft 26 in which a first throttling means 34 is provided.

The connecting duct 32 expands on the inside of the rod insert 28 and there forms a guiding cylinder 32' in which a valve element, preferably in the form of a control piston 36, is guided so that it can be slid axially between two inner race shoulders 38 and 40, in which case it can be controlled in the direction of the inner race shoulder 38 by means of a pressure medium that, via a connecting duct 42, can be supplied to the hollow piston rod 14.

From the front area of the guiding cylinder 32', ducts that have the reference number 44 extend radially toward the outside. The connecting duct 32, together with these radial ducts 44, forms a bypass duct that is independent of the working piston 12, via which bypass duct, by means of the control piston 36, the two cylinder spaces 46 and 48 can be connected with one another.

For this purpose, the control piston 36 is provided with a circumferential groove that, together with the wall of the guiding bore 32', defines a ring duct 50 that, by means of radial bores 52, is connected with an axial guide bore 54 of said control piston 36, a second throttling means 56 being arranged in said guide bore 54 that can be moved against the effect of a pressure spring 58 located within said guide bore 54.

The second throttling means 56 has a throttling piston 57 that, with its conically tapered front end 57', protrudes out of the guide bore 54 of the control piston 36 and is penetrated axially by a throttling duct 60 the cross-section of which is smaller than that of the throttling duct 34' of the first throttling means 34.

In this case, the pressure spring 58 continuously tries to keep the throttling piston 57 with its conically tapered front end piece 57' in contact with an inner race shoulder 62 of the connecting duct 32 in order to separate the two duct segments 32' and 32" from one another.

In the open position of the control piston 36, a mutual connection exists between the two cylinder spaces 46, 48 via the radial bores 44, the ring duct 50 as well as the radial bores 52 and the throttling duct 60. As shown in the drawing, the segment of the throttling piston 57 that is guided in the guide bore 54 of the control piston 36, is formed at its outer circumference as a polyhedron so that between its flat circumferential surface parts 68 and the wall of the guide bore 54 of the control piston 36, flow ducts are located by means of which the front section of the guiding cylinders 32' is continuously connected with the radial bores 52 of the control piston 36.

Instead of said flow ducts, in the case of a control piston 36 that has a larger diameter, connecting ducts may be provided that extend from its upper (front) piston surface 70 to its radial bores 52. In addition, instead of the control piston 36, a correspondingly developed actuating rod may be provided that is arranged in the piston rod so that it can be adjusted axially.

In the closed position of the control piston 36 that is shown in the drawing, when the vibration damper is used, damping fluid flows only through the passage ducts 18 and 20 of the damping valves of the working piston 12. If a softer damping is desired for improving the suspension comfort or rolling comfort of the vehicle, the throttling means 34, 56 must be actuated by shifting the control piston 36 in upward direction by feeding a pressure medium into the piston rod 14 according to the drawing and bringing it to a stop against the inner race shoulder 38. Now, in addition, in the tensile stage, damping fluid will be discharged from the cylinder space 46 to cylinder space 48, having to pass the throttling duct 60 of the second throttling means 56.

In the compression stage, on the other hand, damping fluid flows from the cylinder space 48 via the first throttling means 34 into the duct segment 32" of the connecting duct 32, and presses the throttling piston 57 of the second throttling means 56 against the effect of the pressure spring 58 into the guide bore 54 so that, in addition to being able to flow off via the throttling duct 60 of the second throttling means 56, it can also flow off via the flow ducts existing between the guide bore 54 and the circumference of the throttling piston 57 into the cylinder space 54. In this path of the damping fluid, a much lower damping resistance is therefore in effect than on the pat that extends via the throttling means 56.

During the change form the compression stage to the tensile stage, the pressure spring 58 restores the throttling piston 57 into its shown closed position, so that again only the second throttling means 56 is in effect.

If a harder damping is desired again, the control pressure in the piston rod 14 must be eliminated, causing the pressure spring 58 to be able to control the control piston 36 back into the shown closed position, in which it blocks the radial bores 44. As an alternative, the pressure spring 58 may also only generate a spring force that is not sufficient for the restoring of the control piston 36. In this case, the control piston 36 is acted upon and restored by means of the damping fluid flowing in via the throttling means 34.

The described construction makes it possible that by means of the selection of the throttle cross-sections in both moving directions of the working piston 12, the reduction of the damping force can be adjusted in a defined way.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An adjustable damping force vibration damper for vehicles and the like, comprising:
    a cylinder filled with damping fluid,
    a working piston dividing the cylinder into first and second cylinder spaces, said piston being disposed fixedly on a piston rod extending out of the cylinder,
    damping valve means at the working piston for communicating damping fluid between the first and second cylinder spaced during relative moment of the working piston and cylinder,
    and damping level adjusting means for adjusting the flow of damping fluid between the first and second cylinder spaces, comprising:
    a connecting duct means disposed in the working piston in bypassing relationship to said damping valve means and having respective first and second duct opening means opening to said respective first and second cylinder spaces, said first duct opening means being disposed at one axial end face of the working piston and said second duct opening means being disposed at an annular circumferential surface of the working piston, said connecting duct means including a first throttling bore in said working piston between said first and second duct opening means,
    a control piston axially displacable in the working piston between respective positions blocking and unblocking said second duct opening means in response to selective supply of control fluid to said control piston, thereby blocking and unblocking said connecting duct means, and
    a throttling piston axially guided with a guide bore at one end of the control piston, said throttling piston having an axially extending second throttling bore and being pressure dependably moveable into a throttling position blocking the connecting duct while permitting flow from said connecting duct to said second duct opening means through said second throttling bore in response to one moving direction of the working piston and into an open position permitting flow to the second duct opening means without throttling in response to an opposite moving direction of the working piston.

2. An adjustable vibration damper according to claim 1, wherein said first and second throttling bores have different cross-sectional through flow areas.

3. An adjustable vibration damper according to claim 2, wherein the throttling bore having the smaller cross-sectional through flow area determines throttling resistance for tensile stage relative movement of the working piston and cylinder.

4. An adjustable vibration damper according to claim 3, wherein the second throttling bore has a smaller cross-sectional through flow area than the first throttling bore.

5. An adjustable vibration damper according to claim 4, wherein said throttling piston is continuously spring biased towards its throttling position by a throttling spring interposed between the throttling piston and the control piston.

6. An adjustable vibration damper according to claim 4, wherein the throttling piston is supported in its throttling position with a conical end part engaging an annular opening of an axially extending part of the connecting duct means, said annular opening having a smaller cross-sectional area than an adjacent space in the control piston accommodating the throttling piston.

7. An adjustable vibration damper according to claim 1, wherein said throttling piston is continuously spring biased towards its throttling position by a throttling spring interposed between the throttling piston and the control piston.

8. An adjustable vibration damper according to claim 1, wherein said connecting duct means is disposed centrally in said working piston.

9. An adjustable vibration damper according to claim 8, wherein said connecting duct means, said control piston, and said throttling piston are aligned on a common central axis through said working piston and cylinder.

10. An adjustable vibration damper according to claim 9, wherein the second throttling bore has a smaller cross-sectional through flow area than the first throttling bore.

11. An adjustable vibration damper according to claim 10, wherein said throttling piston is continuously spring biased towards its throttling position by a throttling spring interposed between the throttling piston and the control piston.

12. An adjustable vibration damper according to claim 11, wherein said damping valve means are located in surrounding relation to the working piston at an axial location intermediate the first and second throttling bores.

13. An adjustable vibration damper according to claim 1, wherein said damping valve means are located in surrounding relation to the working piston at an axial location intermediate the first and second throttling bores.

14. An adjustable vibration damper according to claim 13, wherein the throttling bore having the smaller cross-sectional through flow area determines throttling resistance for tensile stage relative movement of the working piston and cylinder.

* * * * *